United States Patent Office 2,854,470
Patented Sept. 30, 1958

2,854,470

DIASTEREOISOMERIC PROPANE DERIVATIVES AND PROCESS FOR THEIR MANUFACTURE

Robert Michel Jacob, Ablon-sur-Seine, and Jacques Georges Robert, Paris, France, assignors, by mesne assignments, to Parke, Davis & Company, Detroit, Mich., a corporation of Michigan No Drawing. Application February 23, 1951
Serial No. 212,489

Claims priority, application France July 21, 1950

9 Claims. (Cl. 260—463)

This invention relates to new disastereoisomeric propane derivatives and to processes for their preparation.

By analogy with the nomenclature adopted by Rebstock et al. (J. A. C. S., vol. 71, pp. 2458–2473) in connection with the diastereoisomeric amido diol, 2-dichloracetamido-1-p-nitrophenylpropane 1:3-diol (also known by the common name "Chloramphenicol") structural isomeric forms are herein referred to as "erythro" and "threo" respectively while the racemic mixture and individual optical isomers corresponding to each of these structural isomeric forms are designated DL, L and D respectively. Configurational representation of the isomers as D and L refers not to actual sign of rotation but to configuration about the alpha carbon atom. Thus the D-threo compounds hereinafter referred to have the same configuration with respect to the alpha carbon atom as the therapeutically active isomer of chloramphenicol which has been designated D(—)-threo 2-dichloracetamido-1-p-nitrophenylpropane 1:3-diol.

The new compounds of the present invention are the racemic and optically isomeric threo esters of 2-dichloracetamido-1-p-nitrophenyl-1-chloro-3-hydroxypropane represented by the conventional formula:

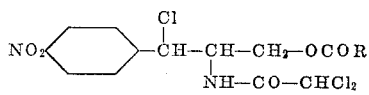

in which R represents an unsubstituted or substituted aliphatic or aromatic radical or an alkoxy group. In one embodiment of this invention, the radical R represents a lower alkyl group or a phenyl group. In a further embodiment, the radical —OCOR is derived from a dibasic carboxylic acid and has the form —R'COOR" where R' represents an alkylene or arylene group and R" represents hydrogen or an alkyl group.

According to one feature of this invention, these new compounds are obtained from the corresponding erythro esters represented by the general formula:

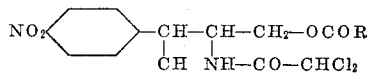

(where R is as hereinbefore defined) by treatment with thionyl chloride under anhydrous conditions. The resultant substitution of hydroxyl by chlorine is accompanied by epimerisation to the threo form.

According to a further feature of this invention, the new compounds are obtained from the corresponding threo esters represented by the general formula set forth in the last preceding paragraph by treatment with hydrogen chloride under anhydrous conditions. In this case, substitution of chlorine for hydroxy is effected with retention of configuration.

The esters employed as starting materials may be obtained, for example, by the action of carboxylic acid chlorides or anhydrides or, in certain cases, of chloro carbonic esters, in the presence of a tertiary base, upon 2-dichloracetamido-1-p-nitrophenylpropane 1:3-diols themselves prepared from the corresponding 2-amino-1-p-nitrophenylpropane 1:3-diols by, for example, the process disclosed in the specification of co-pending application Ser. No. 226,290 (now Patent No. 2,718,527) e. g. by reaction with chloral or chloral hydrate in the presence of an alkali metal cyanide. The said 2-dichloracetamido-1-p-nitrophenylpropane 1:3-diols may also be obtained by hydrolysis of oxazolines of the type:

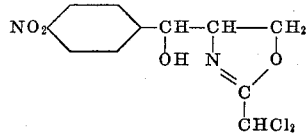

or

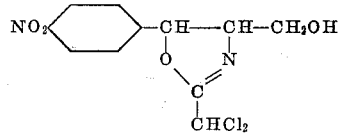

according to the process disclosed in the specification of co-pending application No. 199,937, now abandoned. The starting material for Example 1 may, if desired, be prepared as described in our copending application, now Patent 2,586,661, dated February 19, 1952. Column 2, lines 31 to 42 of said patent describes the preparation of the racemic threo mono-succinyl derivative of 2-dichloracetamido-1-p-nitrophenylpropane - 1,3 - diol by heating with succinic anhydride in dioxane.

It will be appreciated that since the starting material used in the production of the compounds of the present invention can exist in optically isomeric forms, it is necessary, if a particular optical isomer of the final product is to be obtained either to use the starting material in the form of the corresponding isomer or to resolve the racemate produced in the process hereinbefore described. When using an erythro form of said starting material it is necessary to use either the racemic erythro compound with subsequent resolution, or to use the L-erythro isomer if the intended final product is a D-threo ester of 2-dichloracetamido-1-p-nitrophenyl-1-chloro-3-hydroxypropane as the process of epimerisation reverses the configuration about the alpha carbon atom. When using, however, the D-threo or L-threo form the product has, of course, correspondingly the D-threo or L-threo form, respectively, since in this case the conversion does not involve epimerisation.

The DL and D-threo esters of 2-dichloracetamido-1-p-nitrophenyl-1-chloro-3-hydroxypropane of the present invention are important intermediates for the preparation of chloramphenicol and the corresponding DL form thereof and also for the preparation of the useful oxazolines D and DL-threo 2-dichloromethyl-5-p-nitrophenyl-4-hydroxymethyl-Δ²-oxazolines. This can be accomplished by treatment at low temperatures with a dilute aqueous solution of an alkali metal hydroxide to obtain said oxazolines as described in our copending application Ser. No. 212,490, now U. S. Patent 2,694,071. The oxazolines can be treated with dilute hydrochloric acid at low temperature followed by concentrated aqueous ammonia to give 2-dichloracetamido-1-p-nitrophenylpropane-1,3-diols as described and claimed in the copending application of Ronald Slack, Serial No. 199,937, filed December 8, 1950.

The following, non-limitative examples illustrate the invention:

*Example I*

10.8 g. of racemic threo 2-dichloracetamido-1-p-nitrophenyl-3-(3"-carboxypropionoxy)-propane 1-ol of M. P. 163° C. are heated with 50 ccs. of anhydrous dioxane containing 13% of hydrogen chloride for two hours in a closed vessel at 100° C. After cooling, the product is taken up in water and extracted with ether. The ethereal solutions are extracted with an aqueous solution of sodium bicarbonate. On acidification of the alkaline solution with dilute sulphuric acid 2.6 g. of racemic threo 2-dichloracetamido - 1 - p - nitrophenyl - 1 - chloro - 3 - (3''-carboxypropionoxy)-propane are obtained, which after recrystallisation from a mixture of water and of ethanol, melts at 150° C.

*Example II*

5.0 g. of racemic erythro 2-dichloracetamido-1-p-nitrophenyl-3-acetoxypropane 1-ol, M. P. 112–115° C., are heated under reflux for 2 hours in 12.5 ccs. of pure thionyl chloride. The excess thionyl chloride is distilled off under reduced pressure. On taking up the residue in 30 ccs. of ether, the product crystallises and is filtered off, washed with ether and dried in vacuo. There are thus obtained 3.4 g. of racemic threo 2-dichloracetamido-1-p-nitrophenyl-1-chloro-3-acetoxypropane, M. P. 116–118° C., which, after recrystallisation from ethyl acetate, melts at 120° C.

*Example III*

Following the method of Example II, but using 4.5 g. of racemic erythro 2-dichloracetamido-1-p-nitrophenyl-3-carbethoxyoxy-propane 1-ol, M. P. 128–130° C., and 10 ccs. of thionyl chloride, there are obtained 3.5 g. of racemic threo 2-dichloracetamido-1-p-nitrophenyl-1-chloro-3-carbethoxyoxy-propane of M. P. 110–115° C. which, after recrystallisation from benzene, melts at 116–117° C.

*Example IV*

Following the method of Example II, but using 9.05 g. of L-erythro 2-dichloracetamido-1-p-nitrophenyl-3-acetoxypropane 1-ol of M. P. 112–115° C. and $(\alpha)_D^{25} = -14.5°$ (c.=4% in acetone) and 23 ccs. of thionyl chloride, there are obtained, on evaporation of excess thionyl chloride, 10.2 g. of D-threo 2-dichloracetamido-1-p-nitrophenyl-1-chloro-3-acetoxypropane which, after recrystallisation from ethyl alcohol, melts at 101–102° C. and has a rotatory power of $(\alpha)_D^{20} = -8°$ (c.=6.4% in ethyl acetate).

We claim:

1. DL - threo - 2 - dichloracetamido - 1 - p - nitrophenyl-1-chloro-3-(3''-carboxypropionoxy)propane.
2. DL- threo - 2 - dichloracetamido - 1 - p - nitrophenyl-1-chloro-3-acetoxypropane.
3. DL - threo - 2 - dichloracetamido - 1 - p - nitrophenyl-1-chloro-3-carbethoxyoxypropane.
4. A process for the preparation of threo 2-dichloracetamido-1-p-nitrophenyl-1-chloro-3-acetoxypropane which comprises heating at reflux temperature erythro 2-dichloracetamido - 1 - p - nitrophenyl - 3 - acetoxypropane - 1-ol with thionyl chloride under-anhydrous conditions.
5. A process for the preparation of threo 2-dichloracetamido - 1 - p - nitrophenyl - 1 - chloro - 3 - carbethoxyoxypropane which comprises heating at reflux temperature erythro 2 - dichloracetamido - 1 - p - nitrophenyl-3-carbethoxypropane-1-ol with thionyl chloride under anhydrous conditions.
6. A process for the preparation of D-threo 2-dichloracetamido - 1 - p - nitrophenyl - 1 - chloro - 3 - acetoxypropane which comprises reacting heating at reflux temperature L-erythro 2-dichloracetamido-1-p-nitrophenyl-3-acetoxypropane 1-ol with thionyl chloride under anhydrous conditions.
7. D - threo - 2 - dichloracetamido - 1 - p - nitrophenyl-1-chloro-3-acetoxypropane.
8. A threo form of the compound represented by the conventional formula:

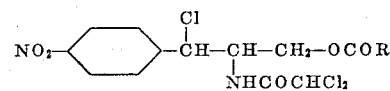

where R is a member of the class consisting of lower alkyl, carboxy-substituted lower alkyl, and lower alkoxy.

9. A process for the preparation of a threo compound of formula,

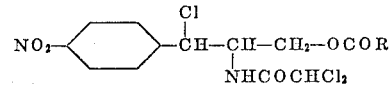

which comprises heating at reflux temperatures with thionyl chloride under anhydrous conditions an erythro compound of formula,

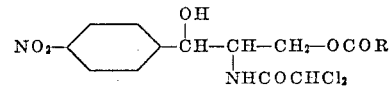

where R is a member of the class consisting of lower alkyl, carboxy-substituted lower alkyl, and lower alkoxy.

References Cited in the file of this patent

UNITED STATES PATENTS

| | | |
|---|---|---|
| 2,114,326 | Adams et al. | Apr. 19, 1938 |
| 2,513,346 | Moersch et al. | July 4, 1950 |
| 2,514,376 | Crooks et al. | July 11, 1950 |
| 2,562,114 | Moersch et al. | July 24, 1951 |
| 2,663,727 | Gailliot et al. | Dec. 22, 1951 |
| 2,694,071 | Jacob et al. | Nov. 9, 1954 |